Feb. 25, 1958 C. A. DECKER ET AL 2,824,395
DISPLAY STRUCTURE
Filed Sept. 17, 1954 2 Sheets-Sheet 1
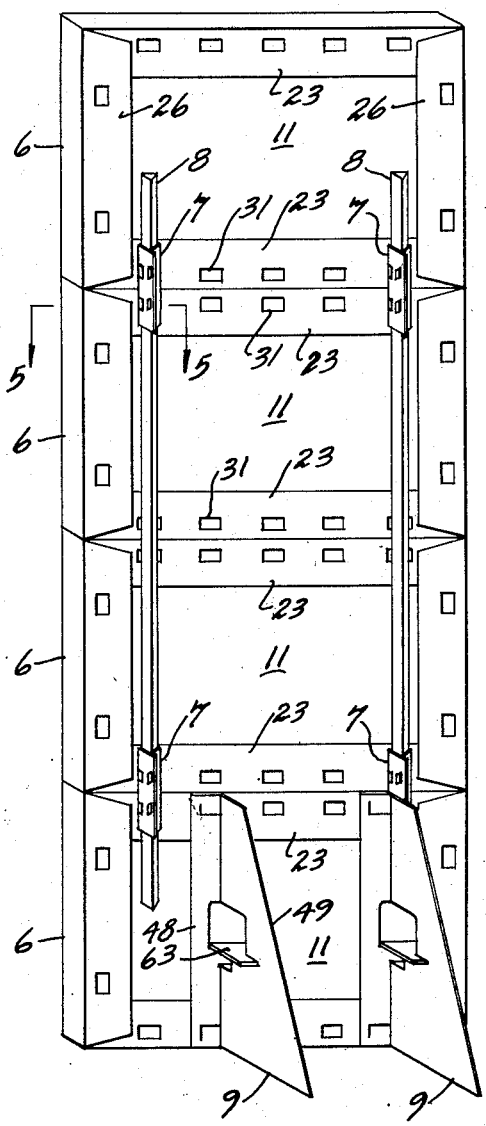
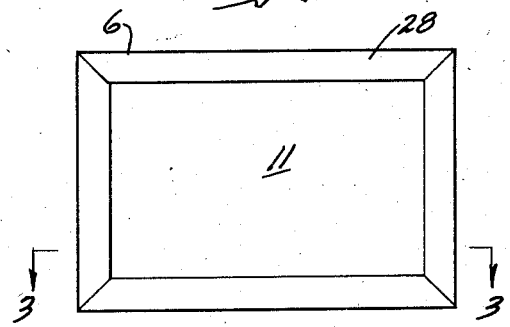
INVENTORS
Charles A. Decker
Kurt Eder
BY
Gary, Desmond & Parker
ATTYS Feb. 25, 1958  C. A. DECKER ET AL  2,824,395
DISPLAY STRUCTURE
Filed Sept. 17, 1954  2 Sheets-Sheet 2
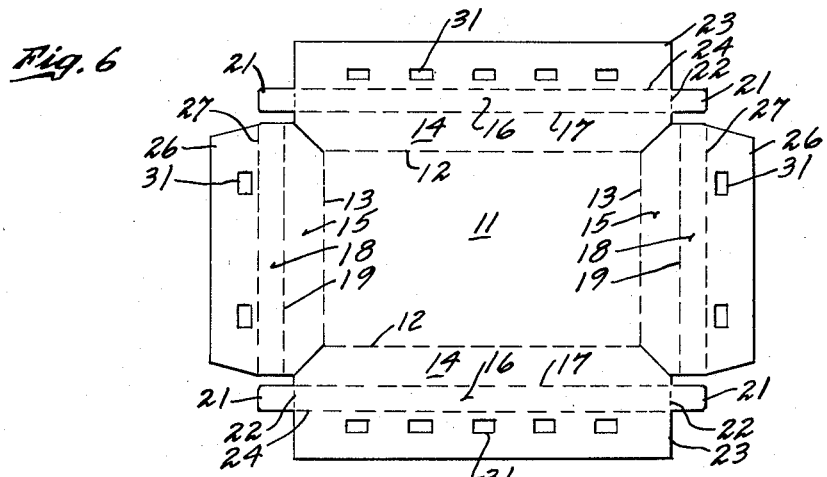
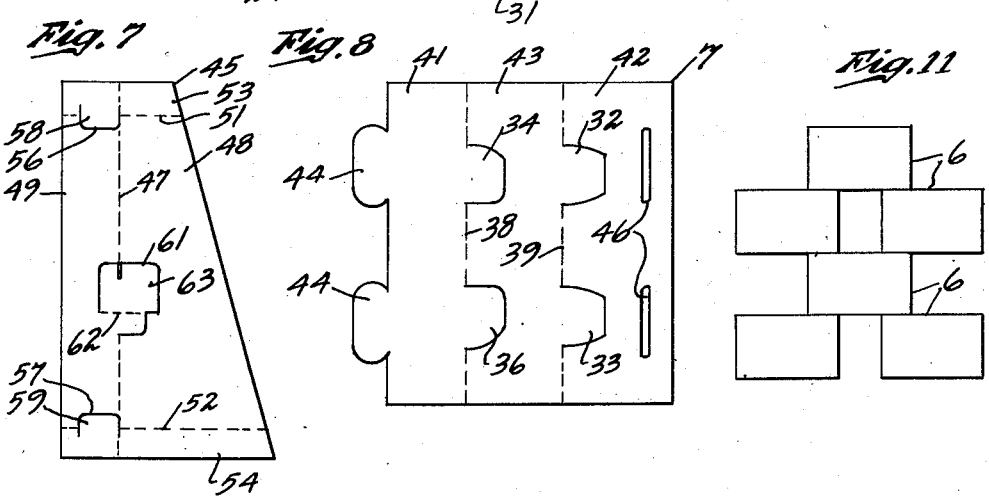
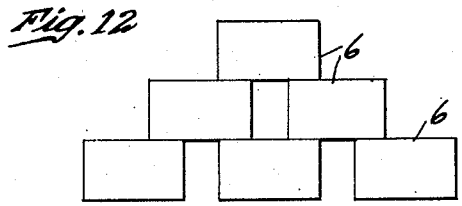
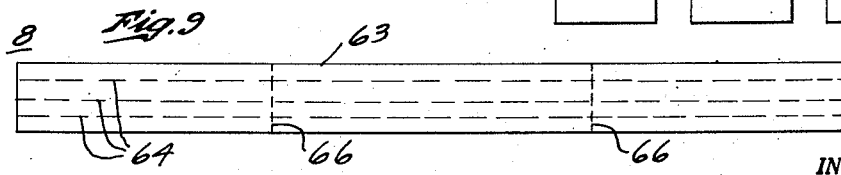
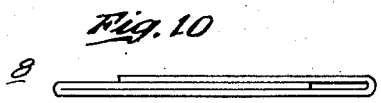
INVENTORS
Charles A. Decker
Kurt Eder
BY
Gary, Desmond & Parker
ATTYS

United States Patent Office 2,824,395
Patented Feb. 25, 1958

2,824,395

DISPLAY STRUCTURE

Charles A. Decker and Kurt Eder, Jersey City, N. J., assignors, by mesne assignments, to Arvey Corporation, Chicago, Ill., a corporation of Delaware Application September 17, 1954, Serial No. 456,834

4 Claims. (Cl. 40—125)

This invention relates to display structures, and more particularly to frame displays of the type comprising a central panel enclosed by a marginal frame.

An object of the invention resides in the provision of a frame display adapted to be simply and inexpensively formed from sheet material such as cardboard.

Another object of the invention resides in the provision of a display structure embodying a plurality of frame displays arranged in stacked relationship.

A further object of the invention resides in the provision of a display structure embodying attachment members for detachably securing frame displays in stacked relationship.

Another object of the invention resides in the provision of a display structure embodying reinforcing members coacting with attachment members for maintaining display frames in stacked alignment.

Another object of the invention resides in the provision of a frame display having a plurality of apertures spaced along the frame thereof to receive locking tongues provided on the attachment members.

A further object of the invention resides in the provision of an easel adapted to be detachably mounted on a frame display.

The invention embodies other novel features, details of construction and arrangement of parts which are hereinafter set forth in the specification and claims and illustrated in the accompanying drawings, wherein:

Fig. 1 is a perspective view illustrating a display structure embodying features of the invention.

Fig. 2 is a front elevational view showing a frame display.

Fig. 3 is an enlarged sectional view taken along the line 3—3 of Fig. 2.

Fig. 4 is a rear elevational view of the frame display.

Fig. 5 is an enlarged detail sectional view taken along the line 5—5 of Fig. 1 illustrating the manner in which the attachment and reinforcing members are mounted on the frame displays to secure the latter in stacked relationship.

Fig. 6 is a plan view showing a blank from which a frame display is formed.

Fig. 7 is a plan view showing a blank as cut and scored to form an easel.

Fig. 8 is a plan view showing a blank as cut and scored to form an attachment member.

Fig. 9 is a plan view showing a blank as cut and scored to form a reinforcing member.

Fig. 10 is a side elevational view showing the reinforcing member in folded condition for shipping and storage.

Figs. 11 and 12 illustrate different stacked arrangements of the frame displays.

Referring now to the drawings for a better understanding of the invention, the display structure is shown in Fig. 1 as comprising a plurality of frame displays 6 interconnected in vertically aligned, stacked relationship by means of attachment members 7 and reinforcing elements 8 detachably interconnecting the frame displays, the lowermost display being provided with easels 9—9 adapted to maintain the stack of displays in upright position.

The frame displays 6 are identical in construction, each frame display being shown, in Figs. 1 to 6, as blanked and formed from sheet material, such as cardboard, to provide a central panel 11 defined by longitudinal and transverse score lines 12—12 and 13—13, respectively. Inner side frame sections 14—14 are hingedly connected to the panel 11 along the score lines 12—12, and inner end frame sections 15—15 are hingedly connected to the panel along the score lines 13—13.

Outer side frame sections 16—16 are hingedly connected to related inner side frame sections 14—14 along score lines 17—17, and outer end frame sections 18—18 are hingedly connected to related inner end frame sections 15—15 along score lines 19—19. Alignment flaps 21—21 are hingedly connected along score lines 22—22 to opposite ends of each of the outer side frame sections 16—16.

Side attachment flaps 23—23 are hingedly connected to related outer side frame sections 16—16 along score lines 24—24, and end attachment flaps 26—26 are hingedly connected to related outer end frame sections 18—18 along score lines 27—27. As illustrated in Fig. 3, each attachment flap is adhesively or otherwise secured to the back side of the panel 11 to form with its related inner and outer frame sections a hollow marginal frame 28 for the central panel 11. Each alignment flap 21 is adapted to engage the inner surface of its related outer frame section.

The attachment flaps 23—23 and 26—26 are formed with rows of rectangular-shape apertures 31 adapted to receive base fingers 32—33 and wing fingers 34—36 provided on the attachment members 7. As illustrated in Fig. 8, each attachment member 7 is shown as comprising a blank of sheet material, such as cardboard, having spaced, parallel score lines 38 and 39 terminating at the bases of related fingers 32, 33, 34 and 36 to form wing sections 41 and 42 hingedly connected to opposite sides of a base section 43. Locking tongues 44—44 are provided on the free edge of the wing section 41 for insertion into slots 46—46 formed in the wing section 42.

Fig. 7 illustrates an easel blank 45 of sheet material, such as cardboard, scored at 47 to provide a wing 48 hingedly connected to a base 49, and scored at 51 and 52 to provide hinge flaps 53 and 54. The blank is formed with U-shape cuts 56 and 57, providing tongues 58 and 59 on the hinge flaps 53 and 54, respectively, for engagement in apertures 31 in the frame displays, as illustrated in Fig. 1. The blank is cut at 61 and scored at 62 to provide a locking flap 63 hinged on the base 49 to secure the wing 48 in its open position perpendicular to the base.

The reinforcing elements 8 each comprise a blank 63 of sheet material, such as cardboard, having longitudinal scores 64 and transverse scores 66, whereby the blank may be folded on the longitudinal scores to be embraced by the attachment members 7, as illustrated in Figs. 1 and 5, or folded on the transverse score lines, as illustrated in Fig. 10, for storage or shipping.

The frame displays 6 may be stacked in various ways, as illustrated in Figs. 1, 11 and 12, and secured together by engaging the fingers 32 and 34 within the apertures 31 of one frame with the fingers 33 and 36 engaged within the apertures 31 of an adjacent frame, and then swinging the free edges of the wing sections 41 and 42 toward each other to embrace the reinforcing element 8 and to engage the tongues 44—44 in their related slots 46—46.

While this invention has been shown in but one form, it is obvious to those skilled in the art that it is not so limited, but is susceptible of various changes and modifications without departing from the spirit and scope of the claimed invention.

We claim:

1. In a stack display structure, a plurality of identical frame displays each constructed from sheet material such as cardboard to provide a central panel enclosed by a hollow marginal frame having a back wall formed with apertures, attachment means formed of sheet material such as cardboard provided with two sets of fingers for engagement within apertures of adjacent frame displays to secure the latter together, said attachment means comprising wing sections hingedly connected to opposite sides of a base section, two of said fingers being formed on said base section, and another two fingers being formed in the inner end of one of said wing sections, and means provided in the wing sections to secure the free ends of the latter to each other, whereby the base and wing sections form a hollow triangular structure, and an elongated reinforcing member of generally triangular section adapted to be snugly embraced within said attachment means.

2. In a stack display structure, a plurality of identical frame displays each constructed from sheet material such as cardboard to provide a central panel enclosed by a hollow marginal frame having a back wall formed with apertures, attachment means formed of sheet material such as cardboard provided with two sets of fingers for engagement within apertures of adjacent frame displays to secure the latter together, said attachment means comprising wing sections hingedly connected to opposite sides of a base section, two of said fingers being formed on said base section, and another two fingers being formed in the inner end of one of said wing sections, and means provided in the wing sections to secure the free ends of the latter to each other, whereby the base and wing sections form a hollow triangular structure, and an elongated reinforcing member of generally triangular section adapted to be snugly embraced within said attachment means, and an easel having two tongues thereon for detachable engagement within two apertures of one of said frame displays.

3. In a cardboard display structure, a plurality of coplanar frame displays arranged in vertically superimposed relationship, cardboard means detachably interconnecting adjacent displays, said cardboard means being folded to comprise vertically aligned sockets, and an elongated vertical reinforcing member slidably engaged in said sockets and supported thereby.

4. In a cardboard display structure, a plurality of coplanar frame displays arranged in vertically superimposed relationship, cardboard means detachably interconnecting adjacent displays and being folded to form triangular cross-sectioned vertically aligned sockets, and a vertical elongated folded cardboard reinforcing member slidably engaged in said sockets.

References Cited in the file of this patent
UNITED STATES PATENTS

| | | |
|---|---|---|
| 1,359,662 | Blyth | Nov. 23, 1920 |
| 1,937,935 | Zimmerman | Dec. 5, 1933 |
| 2,064,056 | Cookson | Dec. 15, 1936 |
| 2,316,615 | Piper | Apr. 13, 1943 |
| 2,512,023 | Johnson | June 20, 1950 |
| 2,563,357 | Nichols | Aug. 7, 1951 |
| 2,737,742 | Leigh | Mar. 13, 1956 |